(12) United States Patent
Tatavarthi et al.

(10) Patent No.: US 9,903,282 B2
(45) Date of Patent: Feb. 27, 2018

(54) PARK POSITIONS FOR VARIABLE CAMSHAFT PHASING SYSTEMS AND METHODS

(71) Applicant: GM Global Technology Operations LLC, Detroit, MI (US)

(72) Inventors: Ramakrishna Tatavarthi, Rochester Hills, MI (US); Etsuko Muraji Stewart, Milford, MI (US); Gregory J. York, Fenton, MI (US); James R. Yurgil, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 433 days.

(21) Appl. No.: 14/755,136

(22) Filed: Jun. 30, 2015

(65) Prior Publication Data

US 2017/0002751 A1    Jan. 5, 2017

(51) Int. Cl.
*F02D 13/08* (2006.01)
*F01L 1/34* (2006.01)
*F02D 13/02* (2006.01)
*F02D 41/04* (2006.01)
*F02N 11/08* (2006.01)
*F02N 19/00* (2010.01)
*F02D 41/00* (2006.01)

(52) U.S. Cl.
CPC ............. *F02D 13/08* (2013.01); *F01L 1/34* (2013.01); *F02D 13/0207* (2013.01); *F02D 41/042* (2013.01); *F01L 2800/00* (2013.01); *F01L 2800/03* (2013.01); *F02D 2041/001* (2013.01); *F02N 11/0814* (2013.01); *F02N 19/004* (2013.01); *Y02T 10/18* (2013.01)

(58) Field of Classification Search
USPC ............................................ 123/90.15, 90.17
See application file for complete search history.

(56) References Cited

U.S. PATENT DOCUMENTS

| | | | |
|---|---|---|---|
| 7,546,827 B1 | 6/2009 | Wade et al. |
| 8,181,508 B2 | 5/2012 | Cinpinski et al. |
| 2009/0014672 A1 | 1/2009 | Schiemann |
| 2009/0206288 A2 | 8/2009 | Schiemann |
| 2010/0263611 A1 | 10/2010 | Kenchington et al. |
| 2010/0281966 A1 | 11/2010 | Cinpinski et al. |
| 2011/0056448 A1 | 3/2011 | Cinpinski et al. |
| 2013/0325290 A1 | 12/2013 | Pierik |

FOREIGN PATENT DOCUMENTS

CN      102022207 A     4/2011

*Primary Examiner* — Mark Laurenzi
*Assistant Examiner* — Wesley Harris (57) ABSTRACT

An engine control system for a vehicle includes a shutdown control module that generates a command to shut down an engine of the vehicle when at least one of: a driver requests the shutdown of the engine via an ignition system; and when one or more predetermined conditions are satisfied for shutting down the engine without the driver requesting shutdown of the engine via the ignition system. A valve control module, when the command to shut down the engine is generated, advances an exhaust camshaft phaser based on a predetermined exhaust park position. When the exhaust camshaft phaser is in the predetermined exhaust park position, an exhaust valve of a cylinder is fully closed during an exhaust stroke of the cylinder before a piston of the cylinder reaches a topmost position for a next intake stroke of the cylinder.

20 Claims, 7 Drawing Sheets

PARK POSITIONS FOR VARIABLE CAMSHAFT PHASING SYSTEMS AND METHODS

FIELD

The present disclosure relates to internal combustion engines of vehicles and more particularly to camshaft park positions and camshaft phaser control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include an internal combustion engine that generates drive torque. More specifically, an intake valve is selectively opened to draw air into a cylinder of the engine. The air mixes with fuel to form an air/fuel mixture that is combusted within the cylinder. The air/fuel mixture is compressed and combusted to drive a piston within the cylinder. An exhaust valve selectively opens to allow the exhaust gas resulting from combustion to exit the cylinder.

A rotating camshaft regulates the opening and closing of the intake and/or exhaust valves. The camshaft includes cam lobes that are fixed to and rotate with the camshaft. The geometric profile of a cam lobe generally controls the period that the valve is open (duration) and the magnitude or degree to which the valve opens (lift). A camshaft phaser regulates phasing of the camshaft relative to a crankshaft.

Variable valve actuation (WA), also called variable valve lift (VVL) improves fuel economy, engine efficiency, and/or performance by modifying valve lift and duration. Two-step WA systems include VVL mechanisms, such as switchable roller finger followers (SRFFs). A SRFF associated with a valve (e.g., an intake or an exhaust valve) allows the valve to be lifted in two discrete modes: a low lift mode and a high lift mode.

An engine control module (ECM) controls the torque output of the engine. For example only, the ECM controls the torque output of the engine based on driver inputs and/or other inputs. The driver inputs may include, for example, an accelerator pedal position, a brake pedal position, inputs to a cruise control system, and/or other driver inputs. The other inputs may include inputs from various vehicle systems, such as a transmission control system.

A vehicle may include an auto-start/stop system that increases the vehicle's fuel efficiency. The auto-start/stop system increases fuel efficiency by selectively shutting down the engine while the vehicle is running. While the engine is shut down, the auto-stop/start system selectively starts up the engine when one or more engine start-up conditions are satisfied.

SUMMARY

In a feature, an engine control system for a vehicle is disclosed. A shutdown control module generates a command to shut down an engine of the vehicle when at least one of: a driver requests the shutdown of the engine via an ignition system; and when one or more predetermined conditions are satisfied for shutting down the engine without the driver requesting shutdown of the engine via the ignition system. A valve control module, when the command to shut down the engine is generated, advances an exhaust camshaft phaser based on a predetermined exhaust park position. When the exhaust camshaft phaser is in the predetermined exhaust park position, an exhaust valve of a cylinder is fully closed during an exhaust stroke of the cylinder before a piston of the cylinder reaches a topmost position for a next intake stroke of the cylinder.

In further features, a park pin extends into an aperture in the camshaft phaser when the exhaust camshaft phaser is in the predetermined exhaust park position and, when extended into the aperture, prevents advancement or retardation of the exhaust camshaft phaser.

In further features, when the command to shut down the engine is generated, the valve control module retards an intake camshaft phaser to a predetermined intake park position. When the intake camshaft phaser is in the predetermined intake park position, an intake valve of the cylinder opens after the piston of the cylinder reaches the topmost position for the next intake stroke of the cylinder.

In further features: a first park pin extends into a first aperture in the exhaust camshaft phaser when the exhaust camshaft phaser is in the predetermined exhaust park position and, when extended into the first aperture, prevents advancement or retardation of the exhaust camshaft phaser; and a second park pin extends into a second aperture in the intake camshaft phaser when the intake camshaft phaser is in the predetermined intake park position and, when extended into the second aperture, prevents advancement or retardation of the intake camshaft phaser.

In further features, when the exhaust camshaft phaser is in the predetermined exhaust park position, the exhaust valve is fully closed during the exhaust stroke of the cylinder at least 2 crankshaft angle degrees before the piston reaches the topmost position for the next intake stroke.

In further features, when the exhaust camshaft phaser is in the predetermined exhaust park position, the exhaust valve is fully closed during the exhaust stroke of the cylinder at least 5 crankshaft angle degrees before the piston reaches the topmost position for the next intake stroke.

7. In further features, when the intake camshaft phaser is in the predetermined intake park position, the intake valve of the cylinder closes at least 40 crankshaft angle degrees after the piston next reaches a bottom most position.

In further features, when the intake camshaft phaser is in the predetermined intake park position, the intake valve of the cylinder closes at least 90 crankshaft angle degrees after the piston next reaches a bottom most position.

In further features a fuel control module, when the command to shut down the engine is generated, disables fueling of the engine.

In further features, the valve control module further controls lifting of the intake valve in a low lift mode and a high lift mode.

In a feature, an engine control method is disclosed. The engine control method includes generating a command to shut down an engine of the vehicle when at least one of: a driver requests the shutdown of the engine via an ignition system; and when one or more predetermined conditions are satisfied for shutting down the engine without the driver requesting shutdown of the engine via the ignition system. The engine control method further includes, when the command to shut down the engine is generated, advancing an exhaust camshaft phaser based on a predetermined exhaust park position. When the exhaust camshaft phaser is in the predetermined exhaust park position, an exhaust valve of a cylinder is fully closed during an exhaust stroke of the cylinder before a piston of the cylinder reaches a topmost position for a next intake stroke of the cylinder.

In further features, a park pin extends into an aperture in the camshaft phaser when the exhaust camshaft phaser is in the predetermined exhaust park position and, when extended into the aperture, prevents advancement or retardation of the exhaust camshaft phaser.

In further features the engine control method further includes, when the command to shut down the engine is generated, retarding an intake camshaft phaser to a predetermined intake park position. When the intake camshaft phaser is in the predetermined intake park position, an intake valve of the cylinder opens after the piston of the cylinder reaches the topmost position for the next intake stroke of the cylinder.

In further features: a first park pin extends into a first aperture in the exhaust camshaft phaser when the exhaust camshaft phaser is in the predetermined exhaust park position and, when extended into the first aperture, prevents advancement or retardation of the exhaust camshaft phaser; and a second park pin extends into a second aperture in the intake camshaft phaser when the intake camshaft phaser is in the predetermined intake park position and, when extended into the second aperture, prevents advancement or retardation of the intake camshaft phaser.

In further features, when the exhaust camshaft phaser is in the predetermined exhaust park position, the exhaust valve is fully closed during the exhaust stroke of the cylinder at least 2 crankshaft angle degrees before the piston reaches the topmost position for the next intake stroke.

In further features, when the exhaust camshaft phaser is in the predetermined exhaust park position, the exhaust valve is fully closed during the exhaust stroke of the cylinder at least 5 crankshaft angle degrees before the piston reaches the topmost position for the next intake stroke.

In further features, when the intake camshaft phaser is in the predetermined intake park position, the intake valve of the cylinder closes at least 40 crankshaft angle degrees after the piston next reaches a bottom most position.

In further features, when the intake camshaft phaser is in the predetermined intake park position, the intake valve of the cylinder closes at least 90 crankshaft angle degrees after the piston next reaches a bottom most position.

In further features the engine control method further includes, when the command to shut down the engine is generated, disabling fueling of the engine.

In further features, the engine control method further includes controlling lifting of the intake valve in a low lift mode and a high lift mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine control module controls engine actuators based on a requested amount of torque. Engine actuators may include, for example, a throttle valve, a fuel system, an ignition system, intake and exhaust camshaft phasers, a variable valve lift (VVL) system, and other types of engine actuators.

When engine shutdown is commanded, the engine control module actuates the intake and exhaust camshaft phasers based on predetermined park positions, respectively. Engine shutdown may be commanded by a driver via an ignition system or by the engine control module for an auto-stop/start event. Park pins actuate and prevent phasing of the intake and exhaust camshafts when the intake and exhaust camshaft phasers are in the predetermined park positions.

According to the present disclosure, the predetermined intake and exhaust park positions are selected based on a target exhaust gas residual for achieving both: (i) target exhaust emissions for cold engine startups and (ii) target noise, vibration, and/or harshness characteristics for auto-start events. The predetermined exhaust park position causes exhaust valve closing before the piston reaches a topmost position between the exhaust stroke of a combustion cycle of a cylinder and the intake stroke of a next combustion cycle of the cylinder. The predetermined intake park position causes intake valve opening after the piston reaches the topmost position.

Figure 1:
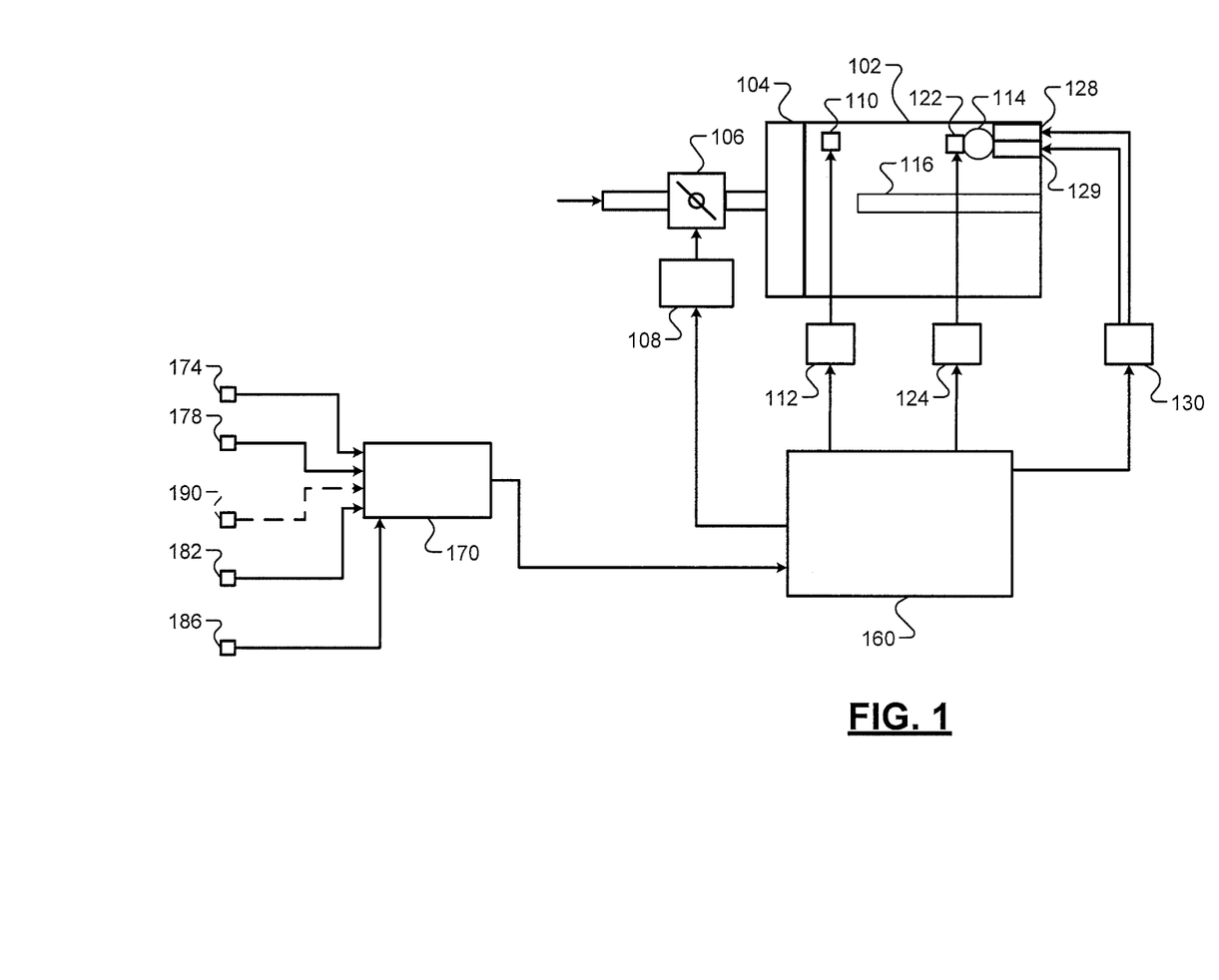
FIG. 1 is a functional block diagram of an example control system.

Referring now to FIG. 1, a functional block diagram of an example engine control system is presented. An engine 102 generates drive torque for a vehicle. Air is drawn into the engine 102 through an intake manifold 104. Airflow into the intake manifold 104 may be varied by a throttle valve 106. A throttle actuator module 108 (e.g., an electronic throttle controller) controls opening of the throttle valve 106. One or more fuel injectors, such as fuel injector 110, mix fuel with the air to form a combustible air/fuel mixture. A fuel actuator module 112 controls the fuel injector(s).

A cylinder 114 includes a piston (not shown) that is coupled to a crankshaft 116. Although the engine 102 is depicted as including only the cylinder 114, the engine 102 may include more than one cylinder. One combustion cycle of the cylinder 114 may include four strokes: an intake stroke, a compression stroke, an expansion stroke, and an exhaust stroke. One engine cycle includes each of the cylinders undergoing one combustion cycle. While a four-stroke combustion cycle is provided as an example, another suitable operating cycle may be used.

Figure 2:
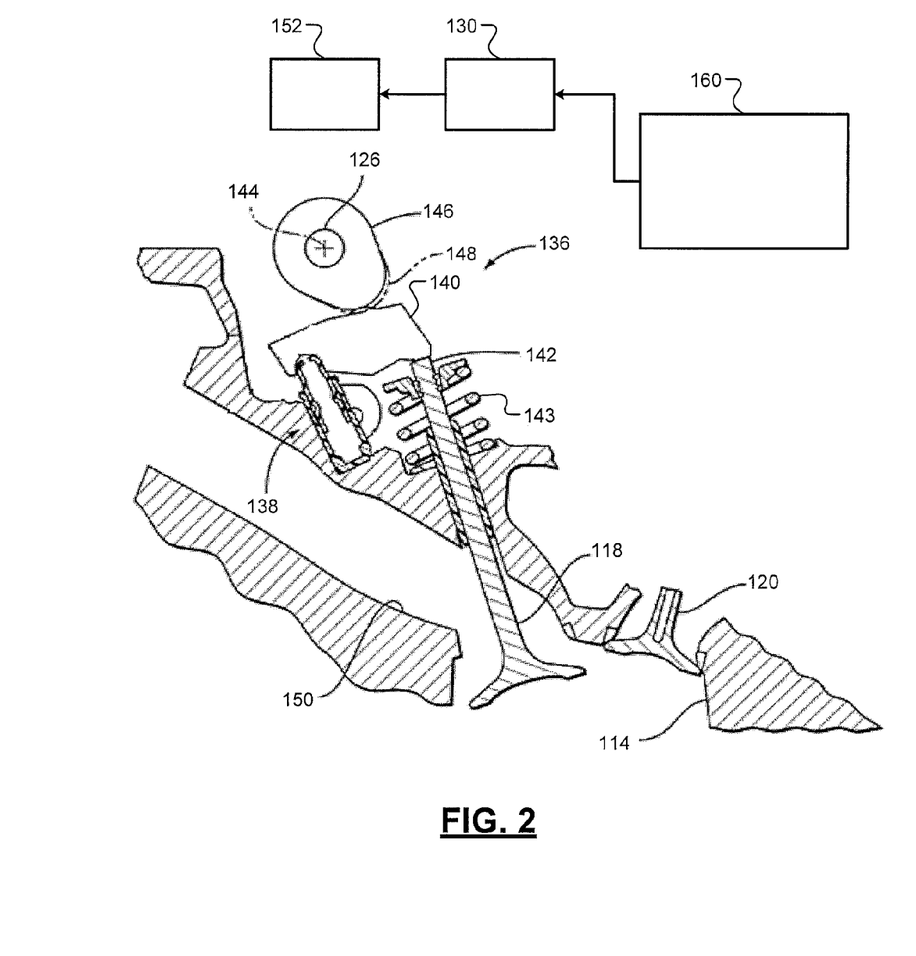
FIG. 2 is a diagram of an example variable valve lift (VVL) system.

FIG. 2 is a diagram including an example variable valve lift (VVL) system. Referring now to FIGS. 1 and 2, during the intake stroke, the piston is lowered to a bottom most position, and air and fuel may be provided to the cylinder 114. The bottom most position may be referred to as a bottom dead center (BDC) position. Air enters the cylinder 114 through one or more intake valves, such as intake valve 118. One or more exhaust valves, such as exhaust valve 120, are also associated with the cylinder 114. For purposes of discussion only, only the intake valve 118 and the exhaust valve 120 will be discussed.

During the compression stroke, the crankshaft 116 drives the piston toward a top most position. The intake valve 118 and the exhaust valve 120 may both be closed during the compression stroke, and the piston compresses the air/fuel mixture within the cylinder 114. The top most position may be referred to as a top dead center (TDC) position. The piston reaches TDC between the compression and combustion/expansion strokes. The piston also reaches TDC between the exhaust stroke of one combustion cycle and the intake stroke of the next combustion cycle. A spark plug 122 may ignite the air/fuel mixture in various types of engines. A spark actuator module 124 controls the spark plug 122.

Combustion of the air/fuel mixture drives the piston back toward the BDC position during the expansion stroke, thereby rotatably driving the crankshaft 116. The rotational force may be a source of compressive force for a compression stroke of a combustion cycle of a next cylinder in a predetermined firing order. Exhaust resulting from the combustion of the air/fuel mixture is expelled from the cylinder 114 during the exhaust stroke. The exhaust is expelled from the cylinder 114 via the exhaust valve 120.

The timing of opening and closing of the intake valve 118 is regulated by an intake camshaft 126. An intake camshaft, such as the intake camshaft 126, may be provided for each bank of cylinders of the engine 102. The timing of opening and closing of the exhaust valve 120 is regulated by an exhaust camshaft (not shown). An exhaust camshaft may be provided for each bank of cylinders of the engine 102. Rotation of the intake camshaft(s) and the exhaust camshaft(s) is generally driven by rotation of the crankshaft 116, such as by a belt or a chain, as discussed further below.

A cam phaser regulates rotation of an associated camshaft. For example only, intake cam phaser 128 may regulate rotation of the intake camshaft 126. The intake cam phaser 128 may adjust the rotation of the intake camshaft 126, for example, with respect to rotation of the crankshaft 116. For example only, the intake cam phaser 128 may retard or advance rotation of the intake camshaft 126, thereby changing the opening and closing timing of the intake valve 118. An exhaust cam phaser 129 regulates rotation of the exhaust camshaft. Adjusting the rotation of a camshaft with respect to rotation of the crankshaft 116 may be referred to as camshaft phasing.

A valve actuator module 130 controls the intake cam phaser 128. The valve actuator module 130 or another valve actuator module may control the exhaust cam phaser 129. The intake and exhaust cam phasers 128 and 129 may be, for example, electrically or hydraulically actuated. A hydraulically actuated cam phaser actuates based on pressure of a hydraulic fluid (e.g., oil) supplied to the cam phaser, as discussed further below.

A variable valve lift (VVL) mechanism 136 (FIG. 2) controls actuation of the intake valve 118. For example only, the VVL mechanism 136 may include a switchable roller finger follower (SRFF) mechanism. While the VVL mechanism 136 is shown and will be discussed as a SRFF, the VVL mechanism 136 may include other types of valve lift mechanisms that enable an associated valve to be lifted to two or more discrete lift positions. Further, while the VVL mechanism 136 is shown and will be discussed as being associated with the intake valve 118, the VVL mechanism 136 or another VVL mechanism may be implemented similarly for the exhaust valve 120. For example only, one VVL mechanism may be provided for each intake valve and one VVL mechanism may be provided for each exhaust valve of a cylinder. VVL may also be referred to as variable valve actuation (WA).

The VVL mechanism 136 includes a lift adjuster 138 and a cam follower 140. The cam follower 140 is in mechanical contact with a valve stem 142 of the intake valve 118. A biasing device 143 biases the valve stem 142 into contact with the cam follower 140. The cam follower 140 is also in mechanical contact with the intake camshaft 126 and the lift adjuster 138.

The intake camshaft 126 rotates about a camshaft axis 144. The intake camshaft 126 includes a plurality of cam lobes including low lift cam lobes, such as low lift cam lobe 146, and high lift cam lobes, such as high lift cam lobe 148. For example only, the intake camshaft 126 may include one low lift cam lobe and one high lift cam lobe for each intake valve of a cylinder. The intake camshaft 126 may also include one additional cam lobe (not shown) for each intake valve of a cylinder for operation in a cylinder deactivation mode. The intake and exhaust valves of one or more cylinders, such as half of the cylinders of the engine 102, are deactivated during operation in the cylinder deactivation mode.

The low and high lift cam lobes 146 and 148 rotate with the intake camshaft 126. Air may flow into the cylinder 114 through an inlet passage 150 when the intake valve 118 is open. Airflow into the cylinder 114 may be blocked when the intake valve 118 is closed. The intake valve 118 is selectively lifted (i.e., opened) and lowered (i.e., closed) via the intake camshaft 126. More specifically, the intake valve 118 is opened and closed by the low lift cam lobe 146 or the high lift cam lobe 148.

A cam lobe contacting the cam follower 140 applies a force to the cam follower 140 in the direction of the valve stem 142 and the lift adjuster 138. The lift adjuster 138 is collapsible and allows the intake valve 118 to be opened to two different positions, a low lift position and a high lift position. The valve actuator module 130 may control a lift actuator module 152 to control actuation of the intake camshaft 126 (e.g., linear actuation along the axis 144), thereby controlling which one of the low and high lift cam lobes 146 and 148 contacts the cam follower 140.

To summarize, during operation in the low lift mode, the low lift cam lobe 146 causes the VVL mechanism 136 to pivot in accordance with the geometry of the low lift cam lobe 146. The pivoting of the VVL mechanism 136 caused by the low lift cam lobe 146 opens the intake valve 118 a first predetermined amount. During operation in the high lift mode, the high lift cam lobe 148 causes the VVL mechanism 136 to pivot in accordance with the geometry of the high lift cam lobe 148. The pivoting of the VVL mechanism 136 caused by the high lift cam lobe 148 opens the intake valve 118 a second predetermined amount. The second predetermined amount is greater than the first predetermined amount.

The period (duration) that the intake valve 118 is open when the high lift cam lobe 148 is used may be greater than the period that the intake valve 118 is open when the low lift cam lobe 146 is used. More specifically, the low lift cam lobe 146 may provide a later intake valve opening and an earlier intake valve closing than the high lift cam lobe 148. While an example hydraulic VVL system has been described, the present disclosure is also applicable to other types VVL systems, such VVL systems including electro-mechanical VVL mechanisms and other types of VVL mechanisms.

Figure 3:
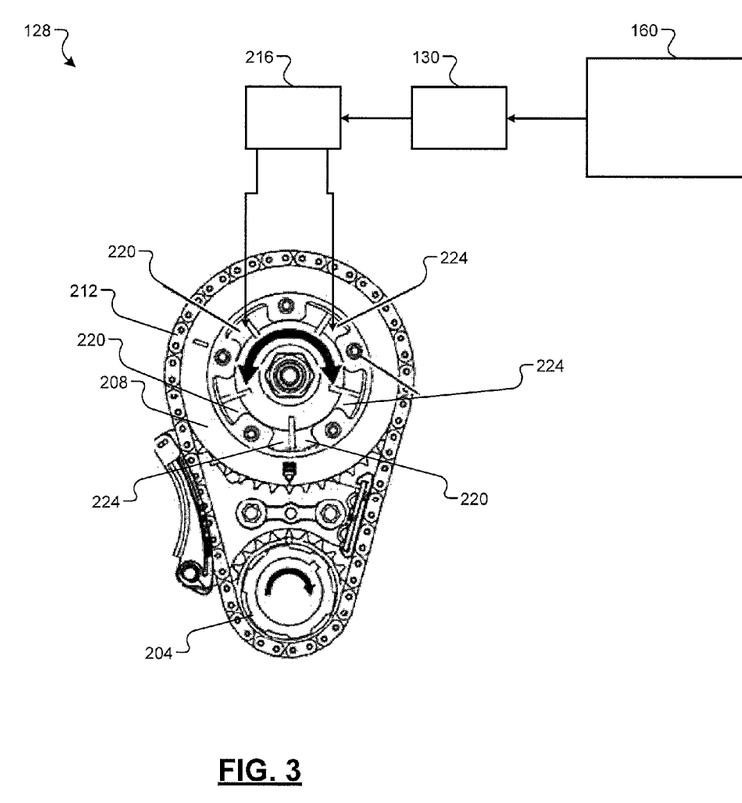
FIG. 3 is an example front view of a cam phaser system.

FIG. 3 includes an example front view of a hydraulic cam phaser system. A first toothed wheel 204 may be coupled to the crankshaft 116, and a second toothed wheel 208 may be coupled to a camshaft, such as the intake camshaft 126. A chain 212 may encircle the first and second toothed wheels 204 and 208 such that rotation of the first toothed wheel 204 drives rotation of the second toothed wheel 208. In this manner, rotation of the crankshaft 116 drives rotation of the intake camshaft 126.

A fluid control valve 216 controls hydraulic fluid (e.g., engine oil) flow to advance chambers 220 and retard chambers 224. The fluid control valve 216 may also be referred to as an oil control valve (OCV). The valve actuator module 130 controls actuation of the fluid control valve 216 to control pressures of hydraulic fluid within the advance chambers 220 and the retard chambers 224. Pressures of the hydraulic fluid within the advance and retard chambers 220 controls phasing of the intake camshaft 126.

For example, when the pressure within the advance chambers 220 is greater than the pressure within the retard chambers 224, rotation of the intake camshaft 126 is advanced relative to the crankshaft 116. Conversely, when the pressure within the advance chambers 220 is less than the pressure within the retard chambers 224, rotation of the intake camshaft 126 is retarded relative to the crankshaft 116.

Figure 4:
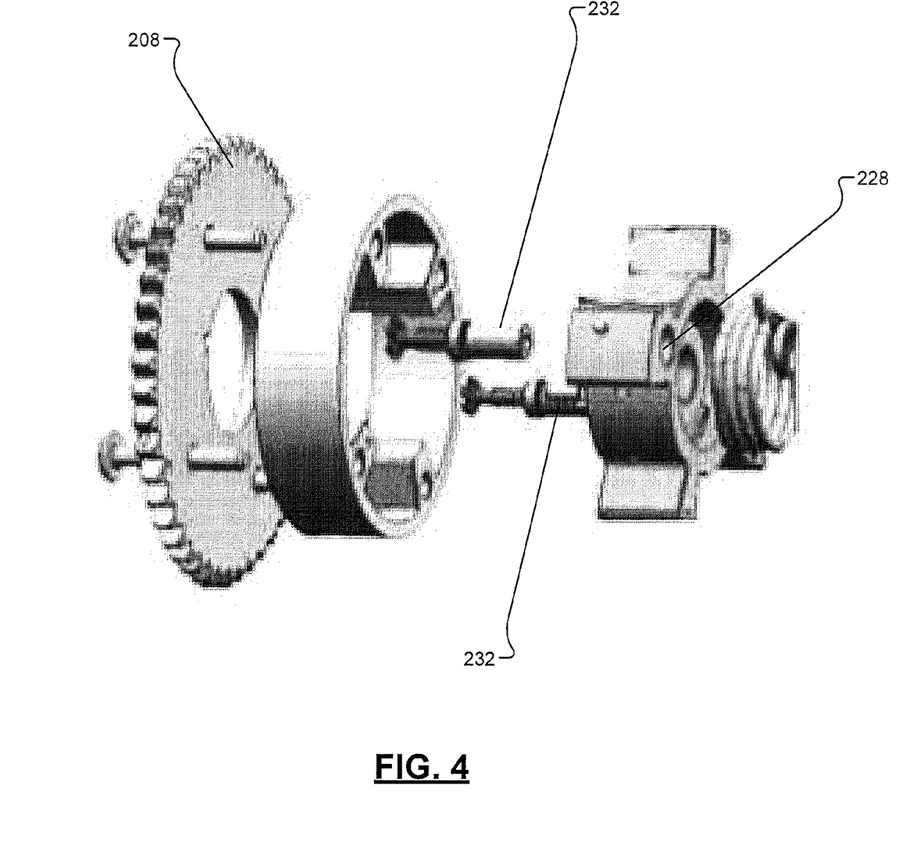
FIG. 4 is an example exploded view of a portion of the cam phaser system.

The second toothed wheel 208 is connected to the camshaft assembly. FIG. 4 includes an example exploded view of a portion of the camshaft assembly. One or more apertures are formed in the camshaft phaser assembly, such as apertures 228. One or more park pins, such as park pins 232, actuate and extend into the apertures 228 when the intake camshaft 126 is phased to approximately a predetermined intake park position. The park pin(s) mechanically contact(s) one or more inner surfaces of the aperture(s) when the intake camshaft 126 is approximately in the predetermined intake park position, thereby fixing rotation of the intake camshaft 126 relative to rotation of the crankshaft 116 and preventing changes in phasing of the intake camshaft 126.

The park pin(s) remain(s) engaged within the aperture(s) while the engine 102 is shut down and is(are) still engaged with the aperture(s) when the engine 102 is next started. The park pin(s) may be retracted from the aperture(s), thereby allowing phasing of the intake camshaft 126, during engine cranking or when the engine 102 is running. For example only, the park pin(s) may be removed via hydraulic fluid pressure within the advance chambers 220 or the retard chambers 224. While the example of a hydraulic camshaft phaser is presented, the present disclosure is also applicable to electrical camshaft phasers. Electric camshaft phasers also include apertures for park pins to lock electric camshaft phasers at predetermined park positions.

While the examples of FIGS. 3 and 4 are discussed in terms of the intake camshaft 126, the exhaust cam phaser 129 similarly phases the exhaust camshaft. More specifically, a third toothed wheel may be coupled to the crankshaft 116, and a fourth toothed wheel may be coupled to the exhaust camshaft. A chain may encircle the third and fourth toothed wheels such that rotation of the third toothed wheel drives rotation of the fourth toothed wheel. In this manner, rotation of the crankshaft 116 drives rotation of the exhaust camshaft.

Pressures of hydraulic fluid in advance and retard chambers of the exhaust cam phaser 129 control phasing of the exhaust camshaft relative to the crankshaft 116. The valve actuator module 130 may control a second fluid control valve or the fluid control valve 216 to control the pressures of hydraulic fluid within these advance and retard chambers.

The fourth toothed wheel is coupled to an exhaust cam phaser assembly. One or more park pins actuate and extend into aperture(s) in the exhaust cam phaser assembly when the exhaust camshaft has been phased to approximately a predetermined exhaust park position. The park pin(s) mechanically contact(s) one or more inner surfaces of the aperture(s) when the exhaust camshaft is approximately in the predetermined exhaust park position, thereby fixing rotation of the exhaust camshaft relative to rotation of the crankshaft 116 and preventing changes in phasing of the exhaust camshaft.

The park pin(s) remain(s) engaged with the aperture(s) while the engine 102 is shut down and is(are) still engaged with the aperture(s) when the engine 102 is next started. The park pin(s) may be retracted from the aperture(s), thereby allowing phasing of the exhaust camshaft, when the engine 102 is running. For example only, the park pin(s) exhaust may be removed via hydraulic fluid pressure.

Vehicle manufacturers have targets for various parameters for engine startups. The predetermined intake and exhaust park positions may be selected based on one or more of the targets. For example, the predetermined intake and exhaust park positions may be selected based on trapping a target exhaust gas residual within cylinders. The target exhaust gas residual may be selected based on achieving one or more target exhaust emissions parameters during cold engine startups. One example target exhaust gas residual corresponds to 8.5 percent of exhaust gas for each combustion cycle.

During engine assembly, the camshaft phasers including apertures for park pins are installed (e.g., fixed to the camshafts) such that the park pins engage the apertures when the camshafts are phased to approximately the predetermined intake and exhaust park positions. Locations of the park pins and/or the apertures may be designed based on the predetermined intake and exhaust park positions.

To achieve the target exhaust gas residual, the predetermined intake and exhaust park positions could be selected such that exhaust valve closing would occur after intake valve opening. Intake valve opening normally occurs during the intake stroke. When exhaust valve closing occurs after intake valve opening, the intake and the exhaust valves of a cylinder would concurrently be open for some period. This situation may be referred to as valve overlap.

Figure 5:
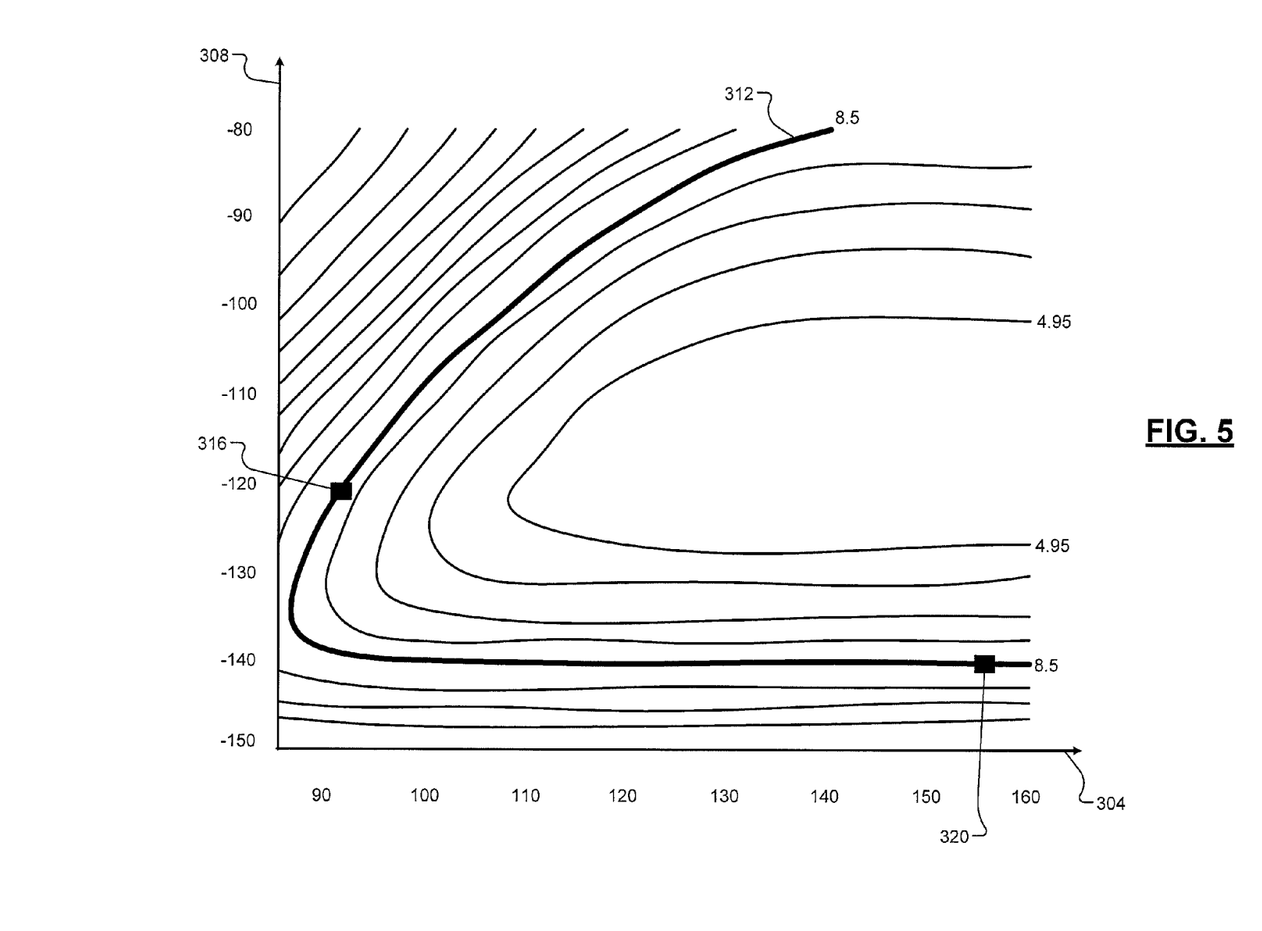
FIG. 5 is an example graph of exhaust gas residual as a function of intake valve maximum opening position and exhaust valve maximum opening position.

FIG. 5 includes an example graph of exhaust gas residuals as a function of intake valve maximum opening position (IMOP) 304 and exhaust valve maximum opening position (EMOP) 308. The IMOP 304 is in terms of crankshaft angle degrees (CAD) after TDC (between the intake and exhaust strokes), while the EMOP 308 is in terms of CAD before TDC (between the intake and exhaust strokes). Valve opening and closing positions depend on the duration of cam lobes used to lift the associated valves. Maximum opening positions correspond to crankshaft angles where the associated valves reached maximum openings.

Example trace 312 tracks combinations of IMOP and EMOP to produce a target exhaust gas residual of 8.5 percent. An exhaust gas residual of 8.5 percent means that 8.5 percent of a total mass within a cylinder for a combustion event is exhaust gas from a last combustion cycle of the cylinder. The remainder of the total mass includes air and fuel. While the example of 8.5 percent is shown and provided, other target exhaust gas residuals may be used. Point 316 corresponds to a first combination of IMOP and EMOP to achieve a target exhaust gas residual of 8.5 percent.

Based on the EMOP 308 for point 316, exhaust valve closing will occur after intake valve opening and there will be some overlap period where both the intake and exhaust valves are open during engine startup. Without other action, such as phasing of the intake and/or exhaust camshafts, intake and exhaust park positions providing the EMOP and the IMOP of point 316 may not as closely as desired achieve noise, vibration, and/or harshness (NVH) targets for auto start events.

Point 320 corresponds to a second combination of IMOP and EMOP for predetermined intake and exhaust park positions to achieve the target exhaust gas residual. Based on the EMOP 308 for point 320, exhaust valve closing will occur before TDC between the exhaust and intake strokes. In other words, the predetermined exhaust park position causes exhaust valve closing before TDC between the intake and exhaust strokes. The predetermined exhaust park position may correspond to exhaust valve closing at least 1 CAD before TDC, at least 2 CAD before TDC, at least 3 CAD before TDC, at least 5 CAD before TDC, at least 7 CAD before TDC, at least 10 CAD before TDC, or at least 15 CAD before TDC in various implementations.

The predetermined intake park position for point 320 causes intake valve opening after exhaust valve closing and after TDC between the exhaust and intake strokes. For an 4-stroke engine where the 4 strokes occur during 2 revolutions of the crankshaft 116, the predetermined intake park position may correspond to intake valve maximum opening at least 90 CAD after TDC, at least 100 CAD after TDC, at least 110 CAD after TDC, at least 120 CAD after TDC, at least 130 CAD after TDC, at least 140 CAD after TDC, or at least 150 CAD after TDC in various implementations. While these examples of openings are provided, other maximum openings are possible.

The predetermined intake park position for point 320 causes intake valve closing (IVC) after BDC. The further IVC is from (e.g., after) BDC, the lower the effective compression ratio will be. Lower effective compression ratio may provide better NVH parameters for auto-start events. The predetermined intake park position may correspond to intake valve closing between, approximately 40 CAD after BDC and approximately 130 CAD after BDC. One example is approximately 110 CAD after BDC.

By performing exhaust valve closing before TDC between the exhaust and intake strokes, residual exhaust gas is trapped within a cylinder for the cylinder's next combustion event. The combination of predetermined intake and exhaust park positions of point 320 allows the target exhaust emissions parameters and the target NVH to be more closely achieved for both cold engine startups and engine startups for auto-start events without having to perform phasing during engine startup. Since the trace 312 for producing the target exhaust gas residual is relatively flat across a large IMOP range, emission targets can be achieved with relatively advanced exhaust park positions during both high lift operation and low lift operation.

Under some circumstances, such as for engine startups at high altitude, valve lifting can be transitioned to or parked at the low lift mode during engine startup. Operation in the low lift mode advances intake valve closing increases effective compression ratio which allows the engine to start easier in cold and/or high altitude engine startups. More specifically, the temperature of the in-cylinder charge of air, fuel, and residual will be higher during low lift operation and therefore enable bettor fuel vaporization and mixing, thereby aiding startability. The ability to perform auto-stops and auto-starts may, however, be disabled under some ambient temperature and/or altitude conditions.

Referring now to FIGS. 1-3, an engine control module (ECM) 160 regulates operation of the engine 102 to achieve a requested amount of torque when the engine 102 is running. For example, the ECM 160 may regulate opening of the throttle valve 106, amount and timing of fuel injection, spark timing, camshaft phasing, lift mode, and other engine operating parameters based on the requested amount of torque.

The ECM 160 may control the torque output of the engine 102 based on, for example, driver inputs and inputs from various vehicle systems. The vehicle systems may include, for example, a transmission system, a hybrid control system, a stability control system, a chassis control system, and other suitable vehicle systems.

A driver input module 170 provides the driver inputs to the ECM 160. The driver inputs may include, for example, an accelerator pedal position (APP), a brake pedal position (BPP), cruise control inputs, and vehicle operation commands. An APP sensor 174 measures position of an accelerator pedal (not shown) and generates the APP based on the position. A BPP sensor 178 monitors actuation of a brake pedal (not shown) and generates the BPP accordingly. A cruise control system 182 provides the cruise control inputs, such as a desired vehicle speed, based on inputs to the cruise control system 182.

The vehicle operation commands may include, for example, vehicle startup commands and vehicle shutdown commands. The vehicle operation commands may be made via actuation of, for example, an ignition key, one or more buttons/switches, and/or one or more suitable ignition input device, such as ignition input device 186.

In vehicles having a manual transmission, the driver inputs provided to the ECM 160 may also include a clutch pedal position (CPP). A CPP sensor 190 monitors actuation of a clutch pedal (not shown) and generates the CPP accordingly. The clutch pedal may be actuated to couple a transmission to the engine 102 and de-couple the transmission from the engine 102. While the APP sensor 174, the BPP sensor 178, and the CPP sensor 190 are shown and described, one or more additional APP, BPP, and/or CPP sensors may be provided.

The ECM 160 selectively shuts down the engine 102 when a vehicle shutdown command is received. For example only, the ECM 160 may disable the injection of fuel, disable the provision of spark, phase the intake and exhaust camshafts to the predetermined intake and exhaust park positions, and perform other engine shutdown operations to shut down the engine 102 when a vehicle shutdown command is received. When a vehicle startup command is received, the ECM 160 may enable provision of spark, enable provision of fuel to the engine 102, engage a starter motor (not shown) with the engine 102, and applying current to the starter motor to start the engine 102.

The ECM 160 may also selectively perform auto-stop events and auto-start events of the engine 102. An auto-stop event includes shutting down the engine 102 when one or more predetermined enabling criteria are satisfied when vehicle shutdown has not been commanded (e.g., while the ignition system is in an ON state). The ECM 160 disables the injection of fuel, disables the provision of spark, phases the intake and exhaust camshafts to the predetermined intake and exhaust park positions, and perform other engine shutdown operations to shut down the engine 102 for an auto-stop event.

While the engine 102 is shut down for an auto-stop event, the ECM 160 may selectively perform an auto-start event. An auto-start event may include, for example, enabling fueling, enabling the provision of spark, engaging the starter motor with the engine 102, and applying current to the starter motor to start the engine 102.

The ECM 160 phases the intake and exhaust camshafts to the respective predetermined park positions at engine shutdown. As described above, engine shutdowns include engine shutdowns performed in response to a vehicle shutdown command and engine shutdowns for auto-stop events. When in the predetermined park positions, the park pins lock the wheels coupled to the intake and exhaust camshafts and prevent phasing of the intake and exhaust camshafts.

Exhaust valve closing occurs before TDC between the intake and exhaust strokes when in the predetermined exhaust park position. Intake valve opening occurs after TDC between the intake and exhaust strokes and intake valve closing occurs after BDC. Residual exhaust gas is therefore trapped within each cylinder from one combustion cycle to the next.

The ECM 160 may control the lift mode based on an ambient temperature and/or an ambient pressure when an engine shutdown is performed, such as for a vehicle shutdown event or an auto-stop event. The ECM 160 operates the VVL system in the low lift mode, thereby providing a higher effective compression ratio, when the ambient temperature is less than a predetermined temperature. Auto-stops may, however, be disabled for low lift mode operation. The higher effective compression ratio may enable the fuel to vaporize to a greater extent during engine startup. When the ambient temperature is greater than the predetermined temperature, the ECM 160 may operate the VVL system in the high lift mode, thereby providing a lower effective compression ratio.

Figure 6:
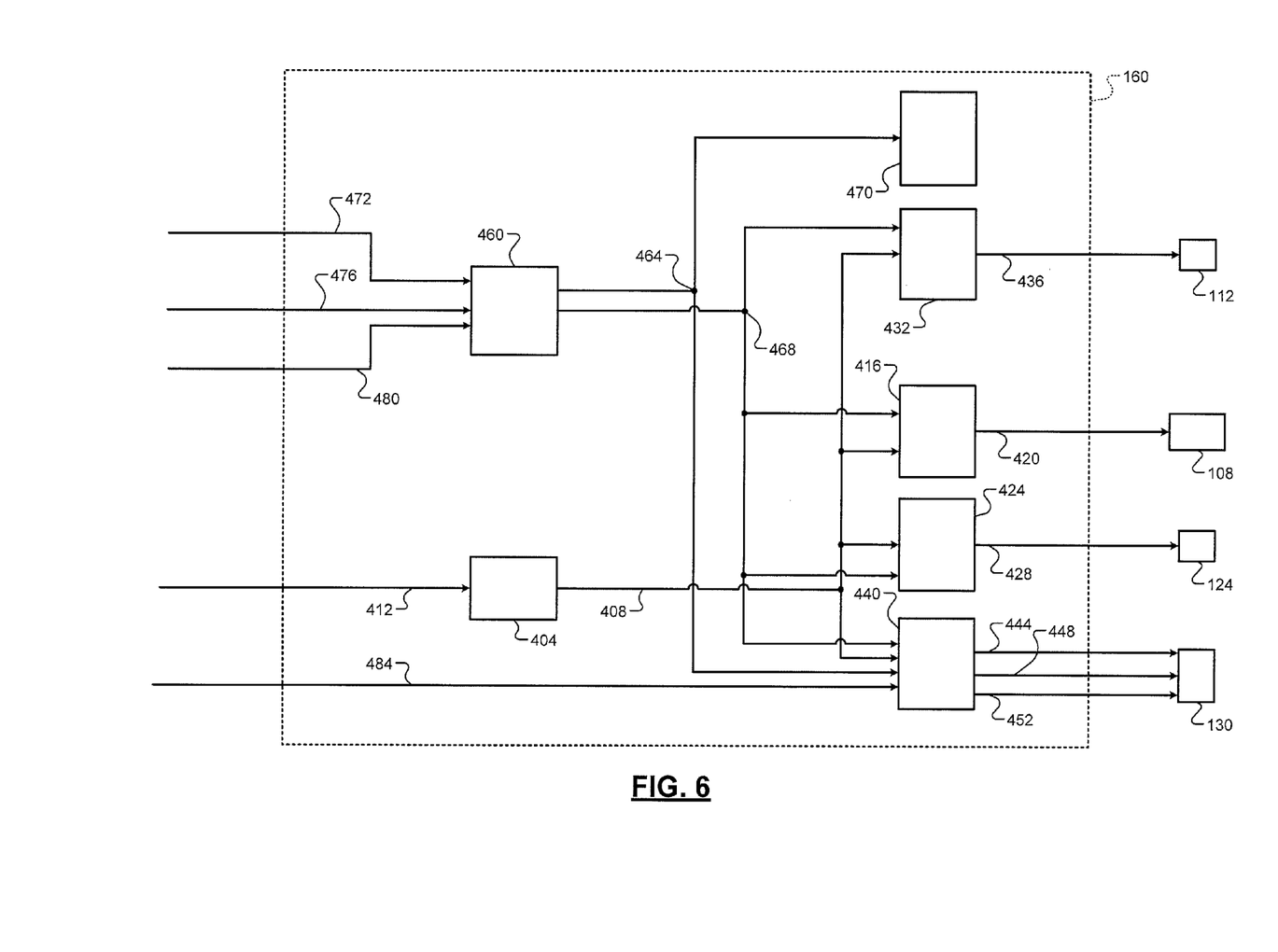
FIG. 6 is a functional block diagram of an example engine control module.

Referring now to FIG. 6, a functional block diagram of an example engine control system including an example implementation of the ECM 160 is presented. A torque request module 404 may determine a torque request 408 based on one or more driver inputs 412, such as an accelerator pedal position, a brake pedal position, a cruise control input, and/or one or more other suitable driver inputs. The torque request module 404 may determine the torque request 408 additionally or alternatively based on one or more other torque requests, such as torque requests generated by the ECM 160 and/or torque requests received from other modules of the vehicle, such as a transmission control module, a hybrid control module, a chassis control module, etc.

One or more engine actuators may be controlled based on the torque request 408 and/or one or more other parameters. For example, a throttle control module 416 determines a target throttle opening 420 based on the torque request 408. The throttle actuator module 108 controls opening of the throttle valve 106 based on the target throttle opening 420.

A spark control module 424 determines a target spark timing 428 based on the torque request 408. The spark actuator module 124 generates spark based on the target spark timing 428. A fuel control module 432 determines one or more target fueling parameters 436 based on the torque request 408. For example, the target fueling parameters 436 may include fuel injection amount, number of fuel injections for injecting the amount, and timing for each of the injections. The fuel actuator module 112 injects fuel based on the target fueling parameters 436.

A valve control module 440 may determine target intake and exhaust cam phaser positions 444 and 448 based on the torque request 408. The valve actuator module 130 controls the intake cam phaser 128 and the exhaust cam phaser based on the target intake and exhaust cam phaser positions 444 and 448, respectively. One or more other engine actuators may be controlled based on the torque request 408.

The valve control module 440 also determines a target lift mode 452. Based on the target lift mode 452, the valve actuator module 130 controls the VVL system to operate the intake valves in the target lift mode 452. For example, the valve actuator module 130 controls the VVL system to operate the intake valves in the low lift mode when the target lift mode 452 indicates the low lift mode. The valve actuator module 130 controls the VVL system to operate the intake valves in the high lift mode when the target lift mode 452 indicates the high lift mode. The valve actuator module 130 controls the VVL system to deactivate intake and exhaust valves when the target lift mode 452 is the cylinder deactivation mode.

A startup/shutdown control module 460 controls startup and shutdown of the engine 102. The startup/shutdown control module 460 generates an engine startup command 464 when a vehicle startup command is input by a driver via the ignition input device 186, such as an ignition button, key, etc. A starter control module 470 engages a starter and applies power to the starter to crank the engine 102 when the engine startup command 464 is generated. The fuel control module 432 and the spark control module 424 begin to provide fuel and spark, respectively, to the engine 102 after the engine startup command 464 is generated.

The startup/shutdown control module 460 generates an engine shutdown command 468 when a vehicle shutdown command is input by a driver via the ignition input device 186. The fuel control module 432 stops providing fuel to the engine 102 to shut down the engine 102 when the engine shutdown command 468 is generated. The spark control module 424 may stop generating spark when the engine shutdown command 468 is generated. Vehicle startup and shutdown commands may be indicated via a vehicle operation signal 472. For example only, the vehicle operation signal 472 may be set to a first state for a vehicle startup command and may be set to a second state for a vehicle shutdown command.

The startup/shutdown control module 460 also generates the engine shutdown command 464 to perform an auto-stop event. For example, the startup/shutdown control module 460 perform an auto-stop event when a vehicle speed 476 is less than a predetermined speed (or stopped) and the driver is depressing the brake pedal. Depression of the brake pedal may be indicated by a brake pedal position (BPP) 480, for example, measured using a BPP sensor. The vehicle speed 476 may be measured using a sensor or determined based on one or more other parameters, such as one or more wheel speeds measured using wheel speed sensors.

Auto-stop events and auto-start events are performed while the ignition system of the vehicle is ON, without the driver requesting that the engine 102 or vehicle be shut down. More specifically, auto-stop events and auto-start events are performed between a time when a driver inputs a vehicle startup command and a next time when the driver inputs a vehicle shutdown command.

The startup/shutdown control module 460 also generates the engine startup command 464 to perform an auto-start event while the engine 102 is shut down for an auto-stop event. For example, the startup/shutdown control module 460 may perform an auto-start event when the driver releases the brake pedal while the engine 102 is OFF for an auto-stop event. The release of the brake pedal may be indicated by the BPP 480. The startup/shutdown control module 460 may also perform an auto-start event when one or more other conditions are met for performing an auto-start event while the engine 102 is OFF for an auto-stop event.

The valve control module 440 sets the target intake and exhaust cam phaser positions 444 and 448 to the predetermined intake and exhaust park positions when the engine shutdown command 468 is generated. The valve actuator module 130 controls the intake and exhaust cam phasers to phase the intake and exhaust camshafts to the predetermined intake and exhaust park positions, respectively.

The park pins engage the camshaft phasers coupled to the intake and exhaust camshafts when the intake and exhaust camshafts are approximately in the predetermined intake and exhaust park positions, respectively, and prevent phasing of the intake and exhaust camshafts. During engine assembly, the camshaft phasers are coupled to the intake and exhaust camshafts such that the park pins engage and lock the apertures when the intake and exhaust camshafts are phased to approximately the predetermined intake and exhaust park positions, respectively.

As discussed above, the predetermined exhaust park position causes exhaust valve closing before TDC between the exhaust and intake strokes during operation in both the high and low lift modes. The predetermined intake park position causes intake valve opening after TDC between the intake and exhaust strokes and intake valve closing after BDC. Exhaust valve closing before TDC allows residual exhaust gas to be trapped within the cylinders. Intake valve closing after BDC decreases effective compression ratio and therefore provides better NVH.

When an engine temperature 484 is low and/or or air density is low (e.g., due to high altitude) when a vehicle startup command is received, injected fuel may have difficulty vaporizing sufficiently. A higher effective compression ratio may enable injected fuel to vaporize to a greater extent. The valve control module 440 may therefore transition the target lift mode 452 to the low lift mode or maintain the target lift mode 452 in the low lift mode at startup when the engine temperature 484 is low.

Figure 7:
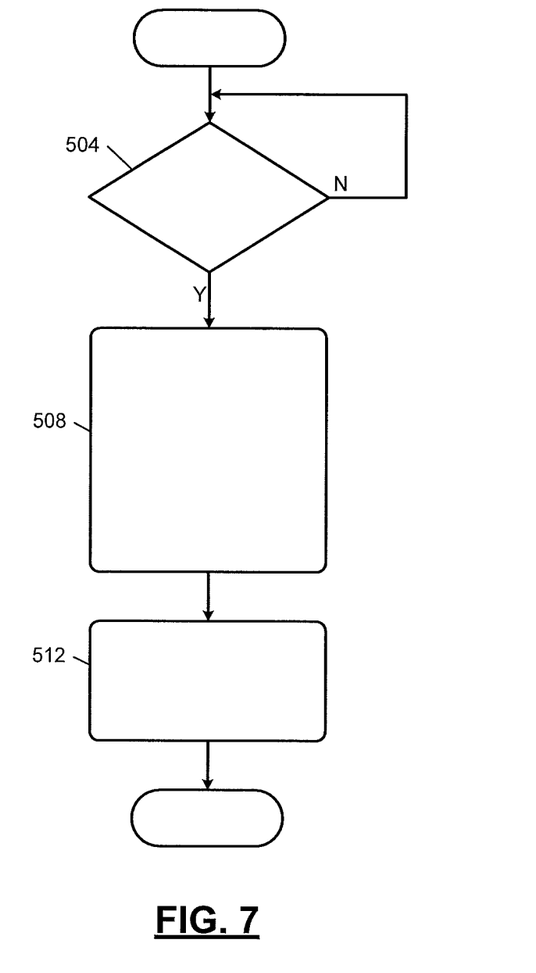
FIG. 7 is a flowchart depicting an example method of parking intake and exhaust camshaft phasers at respective park positions.

FIG. 7 is a flowchart depicting an example method of parking intake and exhaust cam phasers at respective park positions. At 504, while the engine 102 is running, the valve control module 440 determines whether the engine 102 is to be shutdown. The engine 102 may be shutdown, for example, in response to a vehicle shutdown command from a driver or for an auto-stop event. For example, the valve control module 440 may determine that the engine 102 is to be shut down when the engine shutdown command 464 is generated. If 504 is true, control continues with 508. If 504 is false, control remains at 504.

At 508, the valve control module 440 sets the target intake cam phaser position 444 to the predetermined intake park position and sets the target exhaust cam phaser position 448 to the predetermined exhaust park position. The predetermined exhaust park position causes exhaust valve closing before TDC between the exhaust and intake strokes during operation in both the high and low lift modes. The predetermined intake park position causes intake valve closing during the compression stroke, namely after BDC defining the intake and compression strokes. Exhaust valve closing before TDC allows residual exhaust gas to be trapped within the cylinders to meet cold engine startup target values of emissions parameters. Intake valve closing after BDC reduces effective compression ratio and decreases NVH for auto-starts.

At 512, the valve control module 440 controls the intake cam phaser 128 and the exhaust cam phaser based on the target intake and exhaust cam phaser positions 444 and 448, respectively. Accordingly, the valve actuator module 130 phases the intake and exhaust camshafts based to the predetermined intake and exhaust park positions at 512. For example, the valve actuator module 130 may control one or more hydraulic fluid control valves to control pressures of hydraulic fluids within advance and retard chambers of the intake and exhaust cam phasers based on to the predetermined intake and exhaust park positions. The park pins engage the wheels coupled to the intake and exhaust camshafts when the intake and exhaust camshafts are in approximately the predetermined intake and exhaust park positions, respectively, and prevent phasing of the intake and exhaust camshafts. Approximately is used above because the apertures may have dimensions that are slightly larger than outside dimensions of the park pins.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An engine control system for a vehicle, comprising:
a shutdown control module that generates a command to shut down an engine of the vehicle when at least one of:
a driver requests the shutdown of the engine via an ignition system; and
when one or more predetermined conditions are satisfied for shutting down the engine without the driver requesting shutdown of the engine via the ignition system; and
a valve control module that, when the command to shut down the engine is generated, advances an exhaust camshaft phaser based on a predetermined exhaust park position,
wherein when the exhaust camshaft phaser is in the predetermined exhaust park position, an exhaust valve of a cylinder is fully closed during an exhaust stroke of the cylinder before a piston of the cylinder reaches a topmost position for a next intake stroke of the cylinder.

2. The engine control system of claim 1 further comprising a park pin that extends into an aperture in the camshaft phaser when the exhaust camshaft phaser is in the predetermined exhaust park position and that, when extended into the aperture, prevents advancement or retardation of the exhaust camshaft phaser.

3. The engine control system of claim 1 wherein, when the command to shut down the engine is generated, the valve control module retards an intake camshaft phaser to a predetermined intake park position,
wherein, when the intake camshaft phaser is in the predetermined intake park position, an intake valve of the cylinder opens after the piston of the cylinder reaches the topmost position for the next intake stroke of the cylinder.

4. The engine control system of claim 3 further comprising:
a first park pin that extends into a first aperture in the exhaust camshaft phaser when the exhaust camshaft phaser is in the predetermined exhaust park position and that, when extended into the first aperture, prevents advancement or retardation of the exhaust camshaft phaser; and
a second park pin that extends into a second aperture in the intake camshaft phaser when the intake camshaft phaser is in the predetermined intake park position and that, when extended into the second aperture, prevents advancement or retardation of the intake camshaft phaser.

5. The engine control system of claim 3 wherein, when the exhaust camshaft phaser is in the predetermined exhaust park position, the exhaust valve is fully closed during the exhaust stroke of the cylinder at least 2 crankshaft angle degrees before the piston reaches the topmost position for the next intake stroke.

6. The engine control system of claim 3 wherein, when the exhaust camshaft phaser is in the predetermined exhaust park position, the exhaust valve is fully closed during the exhaust stroke of the cylinder at least 5 crankshaft angle degrees before the piston reaches the topmost position for the next intake stroke.

7. The engine control system of claim 3 wherein, when the intake camshaft phaser is in the predetermined intake park position, the intake valve of the cylinder closes at least 40 crankshaft angle degrees after the piston next reaches a bottom most position.

8. The engine control system of claim 3 wherein, when the intake camshaft phaser is in the predetermined intake park position, the intake valve of the cylinder closes at least 90 crankshaft angle degrees after the piston next reaches a bottom most position.

9. The engine control system of claim 1 further comprising a fuel control module that, when the command to shut down the engine is generated, disables fueling of the engine.

10. The engine control system of claim 1 wherein the valve control module further controls lifting of an intake valve in a low lift mode and a high lift mode.

11. An engine control method for a vehicle, comprising:
generating a command to shut down an engine of the vehicle when at least one of:
a driver requests the shutdown of the engine via an ignition system; and
when one or more predetermined conditions are satisfied for shutting down the engine without the driver requesting shutdown of the engine via the ignition system; and,
when the command to shut down the engine is generated, advancing an exhaust camshaft phaser based on a predetermined exhaust park position,
wherein when the exhaust camshaft phaser is in the predetermined exhaust park position, an exhaust valve of a cylinder is fully closed during an exhaust stroke of the cylinder before a piston of the cylinder reaches a topmost position for a next intake stroke of the cylinder.

12. The engine control method of claim 11 wherein a park pin extends into an aperture in the camshaft phaser when the exhaust camshaft phaser is in the predetermined exhaust park position and, when extended into the aperture, prevents advancement or retardation of the exhaust camshaft phaser.

13. The engine control method of claim 11 further comprising, when the command to shut down the engine is generated, retarding an intake camshaft phaser to a predetermined intake park position,
wherein, when the intake camshaft phaser is in the predetermined intake park position, an intake valve of the cylinder opens after the piston of the cylinder reaches the topmost position for the next intake stroke of the cylinder.

14. The engine control method of claim 13 wherein:
a first park pin extends into a first aperture in the exhaust camshaft phaser when the exhaust camshaft phaser is in the predetermined exhaust park position and, when extended into the first aperture, prevents advancement or retardation of the exhaust camshaft phaser; and
a second park pin extends into a second aperture in the intake camshaft phaser when the intake camshaft phaser is in the predetermined intake park position and, when extended into the second aperture, prevents advancement or retardation of the intake camshaft phaser.

15. The engine control method of claim 13 wherein, when the exhaust camshaft phaser is in the predetermined exhaust park position, the exhaust valve is fully closed during the exhaust stroke of the cylinder at least 2 crankshaft angle degrees before the piston reaches the topmost position for the next intake stroke.

16. The engine control method of claim 13 wherein, when the exhaust camshaft phaser is in the predetermined exhaust park position, the exhaust valve is fully closed during the exhaust stroke of the cylinder at least 5 crankshaft angle degrees before the piston reaches the topmost position for the next intake stroke.

17. The engine control method of claim 13 wherein, when the intake camshaft phaser is in the predetermined intake park position, the intake valve of the cylinder closes at least 40 crankshaft angle degrees after the piston next reaches a bottom most position.

18. The engine control method of claim 13 wherein, when the intake camshaft phaser is in the predetermined intake park position, the intake valve of the cylinder closes at least 90 crankshaft angle degrees after the piston next reaches a bottom most position.

19. The engine control method of claim 11 further comprising, when the command to shut down the engine is generated, disabling fueling of the engine.

20. The engine control method of claim 11 further comprising controlling lifting of an intake valve in a low lift mode and a high lift mode.

* * * * *